United States Patent
Reichel et al.

(10) Patent No.: US 8,409,320 B2
(45) Date of Patent: Apr. 2, 2013

(54) PROCESS FOR PRODUCING A FOAMED SLAG ON AUSTENITIC STAINLESS MELTS IN AN ELECTRIC ARC FURNACE

(75) Inventors: Johann Reichel, Duesseldorf (DE); Lutz Rose, Duesseldorf (DE)

(73) Assignee: SMS Siemag AG, Duesseldorf (DE)

( * ) Notice: Subject to any disclaimer, the term of this patent is extended or adjusted under 35 U.S.C. 154(b) by 66 days.

(21) Appl. No.: 12/996,930

(22) PCT Filed: Apr. 8, 2009

(86) PCT No.: PCT/DE2009/000497
§ 371 (c)(1), (2), (4) Date: Jan. 4, 2011

(87) PCT Pub. No.: WO2009/149679
PCT Pub. Date: Dec. 17, 2009

(65) Prior Publication Data
US 2011/0088514 A1    Apr. 21, 2011

(30) Foreign Application Priority Data
Jun. 9, 2008 (DE) .......................... 10 2008 028 011

(51) Int. Cl.
*C21B 13/12* (2006.01)
*C21C 7/076* (2006.01)

(52) U.S. Cl. ........................................ 75/10.61; 65/20
(58) Field of Classification Search ...... 65/20; 75/10.61
See application file for complete search history.

(56) References Cited

U.S. PATENT DOCUMENTS

| 3,525,604 A | 8/1970 | Dornick | |
|---|---|---|---|
| 3,723,098 A * | 3/1973 | Hunt et al. | 75/10.15 |
| 6,709,510 B1 * | 3/2004 | Young et al. | 106/745 |
| 2006/0260435 A1 * | 11/2006 | Rose et al. | 75/10.61 |
| 2009/0255375 A1 | 10/2009 | Reichel et al. | |

FOREIGN PATENT DOCUMENTS

| DE | 103 23 505 | 12/2004 |
|---|---|---|
| EP | 0 829 545 | 3/1998 |
| WO | WO 2004/104232 | 12/2004 |
| WO | WO 2007/087979 | 8/2007 |

* cited by examiner

*Primary Examiner* — George Wyszomierski
*Assistant Examiner* — Tima M McGuthry Banks
(74) *Attorney, Agent, or Firm* — Cozen O'Connor

(57) ABSTRACT

A process for producing a foamed slag on austenitic stainless melts in an electric arc furnace. A mixture of metal oxides and carbon is introduced into the furnace, the metal oxide is reduced by the carbon below the slag at the metal/slag interface, and the resulting gases bring about the foaming of the slag by bubble formation. The mixture to be charged, which is added in the form of preforms such as briquets or pellets, contains iron oxide, iron carriers, carbon and the required binders in addition to nickel oxide.

2 Claims, 1 Drawing Sheet

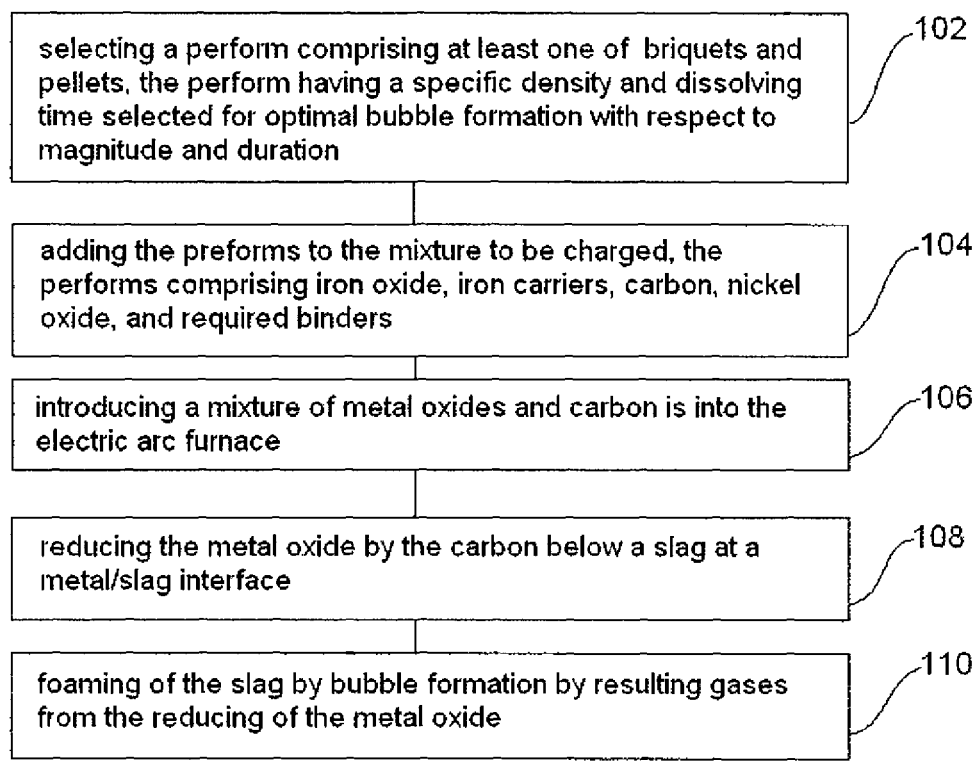

PROCESS FOR PRODUCING A FOAMED SLAG ON AUSTENITIC STAINLESS MELTS IN AN ELECTRIC ARC FURNACE

This is a U.S. national stage of application No. PCT/DE2009/000497, filed on Apr. 8, 2009, which claims Priority to the German Application No.: 10 2008 028 011.9, filed on Jun. 9, 2008, the contents of both being incorporated herein by reference.

BACKGROUND OF THE INVENTION

1. Field of the Invention

The invention is directed to a method for producing a foamed slag on austenitic stainless melts in an electric arc furnace. A mixture of metal oxides and carbon is introduced into the furnace, the metal oxide is reduced by the carbon below the slag at the metal/slag interface, and the resulting gases bring about the foaming of the slag by bubble formation.

2. Related Art

In the operation of electric arc furnaces, the charge, i.e., primarily scrap and alloys, is melted by the electric arcs of electrodes projecting downward into the furnace vessel.

The slag in the foamed state carries out a protective function in addition to its primary function of removing unwanted components from the melt.

In this state, the slag envelopes the space between the ends of the electrodes and the metal surface and protects a refractory lining of the furnace from radiant energy of the electric arc. Since the foamed slag is a poor conductor of heat, the radiation of the electric arc against the wall of the electric furnace is sharply reduced, and the introduction of energy into the metal melt is accordingly improved.

In the case of nonstainless steels or steels with a low chromium content, the foamed slag is achieved by injecting carbon and oxygen simultaneously.

In melts with high chromium content, the injected carbon reacts principally as a reducing agent of the chromium oxide. Due to the very low iron oxide content in the slag, the desired degree of foaming cannot be achieved.

According to EP 0 829 545 B1, an improvement is achieved in that a powder comprising a metal oxide, either zinc oxide or lead oxide, and carbon is introduced into the slag. The oxide contained in the powder is reduced by reaction with the carbon, and bubbles are formed by the occurring carbon monoxide for foaming. The large surface area of the powder results in very powerful, locally limited reactions.

It is known from DE 103 23 505 to charge preforms such as pellets or briquets instead of powder to achieve a very controlled, uniform and gradual reaction.

However, problems occur whenever a slag with concentrations of chromium oxide greater than 10% is formed during the melting of the solid material in the electric arc furnace. It has not been possible thus far to liquefy and foam slags of this kind to the desired extent because of their composition.

SUMMARY OF THE INVENTION

It is the object of the invention to provide a method which allows a foaming of the slag to occur even with the high proportions of chromium oxide mentioned above.

This object is met according to the invention in that the mixture to be charged, which is added in the form of preforms such as briquets or pellets, contains iron oxide, iron carriers, carbon and the required binders in addition to nickel oxide.

The specific density of the material and the dissolving time are selected in such a way that optimal bubble formation is achieved with respect to magnitude and duration. The specific density is preferably about 6.7 t/m$^3$.

The proportion of nickel oxide contained in the very active mixture produces a powerful reaction with the carbon but, because of the shape, i.e., as pellets or briquets, this reaction proceeds in a controlled manner, namely, is not locally limited, and is distributed two-dimensionally at the metal/slag interface because the preforms float below the slag.

BRIEF DESCRIPTION OF THE DRAWINGS

In the drawings:

FIG. 1 is a flowchart of a process for producing a foamed slag or austenitic stainless steel.

DETAILED DESCRIPTION OF THE DRAWINGS

A process for producing a foamed slag on austenitic stainless melts in an electric arc furnace is shown in FIG. 1. A preform is selected for optimal bubble formation (102). A mixture of metal oxides and carbon is introduced into the furnace. The metal oxide is reduced by the carbon below the slag at the metal/slag interface (108). The resulting gases bring about the foaming of the slag by bubble formation (110). The mixture to be charged, which is added in the form of preforms (104) such as briquets or pellets, contains iron oxide, iron carriers, carbon and the required binders in addition to nickel oxide. A specific density of the preforms and the dissolving time are selected in such a way that optimal bubble formation is achieved with respect to magnitude and duration (102). In a preferred embodiment, the specific density of the preform is approximately 6.7 t/m$^3$ Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A process for producing a foamed slag having a chromium oxide concentration of at least 10% on austenitic stainless melts in an electric arc furnace, comprising:
    selecting a preform comprising at least one of briquets and pellets, the preform having a specific density and dissolving time selected for optimal bubble formation with respect to magnitude and duration such that the selected preform floats below a slag/metal interface with a controlled bubbling with respect to the bubble magnitude and the bubble duration, the preforms comprising iron oxide, iron carriers, carbon, nickel oxide, and required binders;

adding the preforms to a mixture to be charged so that the preforms are distributed two-dimensionally below the slag/metal interface;

introducing the mixture of metal oxides and carbon is into the electric arc furnace;

reducing the metal oxide by the carbon below a slag at a metal/slag interface; and foaming of the slag by bubble formation by resulting gases from the reducing of the metal oxide.

2. The process according to claim 1, wherein the specific density is about 6.7 t/m$^3$.

* * * * *